United States Patent
Hachimaki

(10) Patent No.: US 6,370,887 B1
(45) Date of Patent: Apr. 16, 2002

(54) COMPRESSED AIR DEHUMIDIFIER AND A DEHUMIDIFICATION DEVICE AND A MODIFIED SYSTEM FOR THESE

(75) Inventor: Takeshi Hachimaki, Akashi (JP)

(73) Assignee: NABCO LTD, Kobe (JP)

( * ) Notice: Subject to any disclaimer, the term of this patent is extended or adjusted under 35 U.S.C. 154(b) by 0 days.

(21) Appl. No.: 09/654,950

(22) Filed: Sep. 5, 2000

(30) Foreign Application Priority Data

Sep. 3, 1999 (JP) .......................................... P11-250121

(51) Int. Cl.[7] .......................... F25D 17/06; B01D 53/22
(52) U.S. Cl. .................... 62/94; 62/272; 96/8
(58) Field of Search ............... 62/94, 271, 93, 62/272–298, 248; 96/8, 4

(56) References Cited

U.S. PATENT DOCUMENTS

| 4,685,941 A | * | 8/1987 | Sato |
| 4,718,921 A | * | 1/1988 | Makino et al. |
| 5,762,690 A | * | 6/1998 | Hermann |

FOREIGN PATENT DOCUMENTS

JP          10277351 A  * 10/1998

* cited by examiner

Primary Examiner—Denise L. Esquivel
Assistant Examiner—Chen-Wen Jiang
(74) Attorney, Agent, or Firm—James Ray & Associates

(57) ABSTRACT

A modified system of an adsorption/regeneration type dehumidifier that is equipped with a dehumidification case that internally supports an adsorption/regeneration type dehumidification cartridge that is inserted from an opening part. A check valve is provided on this dehumidification case that blocks the back flow from the secondary side by its being arranged in the passage that connects with the dry air discharge part of the dehumidification cartridge. A regeneration restrictor is arranged inside fastening holes formed inside the dehumidification case parallel to the check valve. A bottom cover supports the dehumidification cartridge while covering the opening part of the dehumidification case and a modified system of a dehumidifier that includes a hollow-fiber membrane type dehumidification cartridge that can be supported on the interior of the dehumidification case. There is a stopper plug for stopping up the fastening holes of the regeneration restrictor.

11 Claims, 10 Drawing Sheets

COMPRESSED AIR DEHUMIDIFIER AND A DEHUMIDIFICATION DEVICE AND A MODIFIED SYSTEM FOR THESE

FIELD OF THE INVENTION

The present invention relates to a modified system that modifies the dehumidification devices included in compressed air source devices employed in such things as railway cars, etc. and the dehumidifiers included in these dehumidification devices, as well as the dehumidification device and the dehumidifier for these modifications.

BACKGROUND OF THE INVENTION

Previously, the item shown in FIG. 8 was, for example, known as a compressed air source device which supplied compressed air to the dehumidification devices included in compressed air source devices employed in such things as railway cars, and the dehumidifiers included in these dehumidification devices. This compressed air source device is equipped with a dehumidifier (2) whereby compressed air is supplied from an air compressor (1) through the medium of an aftercooler (not shown in FIG. 8), a regenerated air tank (3) connected to the secondary side of the dehumidifier, and an original air tank (5) connected to the secondary side of the regenerated air tank (3) through the medium of a check valve (4), and a pressure regulator (6) has been connected to the secondary of the original air tank.

The dehumidifier (2) is equipped with (a) an absorption/regeneration style dehumidification cartridge (7) that contains inside it an adsorbent required for drying and periodic regeneration treatment; and (b) a check valve (8) and a restrictor (9) connected parallel to one another on the secondary side of the dehumidification cartridge (7); and the secondary side with the check valve (8) and the restrictor (9) has been connected to a regenerated air tank (3).

In addition, a discharge valve (10) is connected to the primary side of the dehumidification cartridge (7), and this discharge valve (10) is configured such that its opening and closing is controlled by a solenoid-controlled valve (11), and compressed air is discharged through the medium of a muffler (12) when the dehumidifier (2) is regeneration, as described below.

In other words, ordinarily as shown in the figure while the second valve body (19) of the solenoid-controlled valve (11) is in a closed state, the first valve body (18) changes to an open state, compressed air is supplied to the pilot pressure chamber (10c) of the discharge valve (10) through the medium of the second chamber (11b) and the first chamber (11a) of the solenoid controlled valve (11), and the valve body (13), that is, the discharge valve (10) changes to a closed state due to the force applied by a spring (17) since the internal pressures of the second chamber (10b) and the pilot pressure chamber (10c) have become equal.

Owing to this, the compressed air from the air compressor (1) is supplied to the regenerated air tank (3) and the original air tank (5) through the medium of the check valve (8), and the pressures inside the regenerated air tank (3) and the original air tank (5) gradually rise. Then, when the pressure inside the original air tank (5) attains the prescribed upper limit value, the pressure regulator (6) begins to operate, and the air compressor (1) is stopped, and at the same time as this the drive solenoid (21) of the solenoid-controlled valve (11) is turned off and the valve rod (22) is driven upwards in the figure, and owing to this said first valve body (18) changes to a closed state and said second valve body changes to an open state (not shown in the figure).

Consequently, the compressed air inside the pilot pressure chamber (10c) is emitted into the atmosphere through the medium of the first chamber (11a) and the third chamber (11c) of the solenoid-controlled valve (11), and the internal pressure of the second chamber (11b) becomes high than the internal pressure of the first chamber (11a), the result of which is that the diaphragm (15) shifts upwards in the diagram in opposition to the force applied by the spring (17), and the valve body (13), that is, the discharge valve (10) changes to a open state (not shown in the figure).

When the discharge valve (10) opens, the compressed air inside the regenerated air tank (3) is emitted to the atmosphere through the medium of the restrictor (9) and by way of the check valve (8), the discharge valve (10) and the muffler (12), and in this process the adsorbent inside the dehumidification cartridge (7) is dried and regenerated. After that, the compressed air inside the original air tank (5) is consumed by said air compressor, and owing to this the pressure inside the original air tank (5) falls to the prescribed lower limit value. When this occurs, the solenoid-controlled valve (11) begins to operate in linkage with the operation of the pressure regulator (6), and the discharge valve (10) is closed, and at the same time said air compressor (1) is set in operation and compressed air is supplied again to the regenerated air tank (3) and the original air tank (5) through the medium of the check valve (8), etc., by steps identical with those noted above. Subsequently, the pressure inside the original air tank (5) is controlled such that it ordinarily falls within a range between the prescribed upper limit value and the lower limit value by repeating the same operation.

Next, an explanation will be provided of the concrete composition of the compressed air source device. As shown in FIG. 9, a dehumidification case (26) with a dehumidification cartridge (7) built into it has been provided as an adjunct on the tube seat surface (25a) of the tube seat (25) on one side of the fastening unit (24) composed of brackets (23) used for fastening to railway cars on the outer circumferential surface of said regenerated air tank (3). On the other hand, as shown in FIG. 10, a discharge valve (10), a solenoid-controlled valve (11), a muffler (12) and a check valve (4) have been fastened to the tube seat surface (27a) of the tube seat (27) on the other side of the fastening unit (24). The fastening unit (24) equipped with these valves (10, 11) and the dehumidifier (2) together comprise the adsorption/regeneration type dehumidification device (J1).

A compressed air entrance connected to said air compressor (1) and a compressed air exit connected to said original air tank (5) have been provided on the outer circumferential surface of the regenerated air tank (3), and the compressed air entrance (3a) has been connected to the entrance hole (30c) (refer to FIG. 11) through the medium of the connection opening (25b) of the tube seat (25) by means of a coupling tube (28) provided inside the regenerated air tank (3).

In FIG. 11, the right portion in the figure of the dehumidification case (26) of the dehumidifier (2) has a double structure, and in addition to an outer chamber (32) possessing several passageways (32a, 32b) between the outer wall (30) and the inner wall (31) whereon said entrance hole (30a) has been created, an inner chamber (33) has been formed inside the inner wall (31) and said adsorption/regeneration type dehumidification cartridge (7) has been built into the inside of the inner chamber (33). A bottom cover (34) has been fastened on the bottom part of the dehumidification case (26).

As shown by arrow A, the compressed air introduced from the entrance hole (30a) to the inside of the outer chamber

(32) is supplied to the inside of the inner chamber (33) through the medium of the linkage opening (31a) provided on the inner wall (31), and is sent inside the dehumidification cartridge (7) from the lower end side in the figure. The compressed air that passes through the dehumidification cartridge (7) is supplied to the passageway (32a) inside the outer chamber (32) as shown by arrow B through the medium of said check valve (8) that is provided on the upper end side of the dehumidification case (26) and that allows only circulation from the dehumidification case (7) to the outer chamber (32) side. After that, it is configured such that the compressed air is sent inside the regenerated air tank (3) (FIG. 9) through the medium of the exit hole of the dehumidification case (26) and the connection opening provided on the tube seat (25) (neither of which are shown in the figure).

The compressed air inside the regenerated air tank (3) is sent into said check valve (4) through the medium of the connection opening (27b) provided on the tube seat (27), and the secondary side of the check valve (4) has been linked together with said compressed air exit (36) through the medium of the connection opening (27c) of the tube seat and a coupling tube (35) arranged inside the regenerated air tank (3). In addition, said restrictor (9) has been fastened to the fastening hole (31b) provided on the upper end part of the inner wall (31) of the dehumidification case (26), and as shown by arrow C in FIG. 11 when the dehumidification cartridge (7) is being regenerated the compressed air that has passed through the restrictor (9) flows from the dehumidification cartridge (7) to the passageway (32b) inside the outer chamber (32).

The device is configured such that this compressed air is further sent to said discharge valve (10) through the medium of the discharge hole (30b), the connection opening (25c) of the tube seat (25), and the coupling tube (36) arranged inside the regenerated air tank (3). Moreover, the space inside the regenerated air tank (3) has been linked with said second chamber 11(b) of the solenoid-controlled valve (11) by a connection opening (27d) provided on the tube seat (27). Now, the passageways (32a, 32b) inside the outer chamber (32) have been partitioned from one another, and in addition the passageway (32b) and the entrance hole (30a) have been linked together.

However, in order that the compressed air source device employed in the above-mentioned adsorption/regeneration type dehumidifier (2) causes the dry air for the purpose of regenerating the adsorbent when the air compressor (1) is stopped to flow to the dehumidification cartridge (7), many parts are required, such as the regenerated air tank (3) that stores air separately from the original air tank (5), and said discharge valve (10), solenoid-controlled valve (11), etc., so there are the problems that the structure becomes complex and moreover that frequent maintenance work is required.

In relation to this, in recent years a dehumidifier employing hollow-fiber membranes composed of macromolecular materials has been proposed (refer to Utility Model Gazette H6-134244 (1994)). Such hollow-fiber membrane is something that causes dehumidification by causing the hollow-fiber membranes to be permeated by only the vapor molecules inside the hollow-fiber membranes by the action of the partial pressure of vapor due to the fact that a portion of the dry air of the dehumidifier is caused to flow to the outside of the hollow-fiber membranes while the moist air is caused to flow the inside of the hollow-fiber membranes. In this instance, it differs from the items employing an adsorbent, and since regenerative action therefore becomes unnecessary in the period when the air compressor (1) is stopped the above-mentioned regenerated air tank (3) and discharge valve (10), solenoid valve (11), etc., become unnecessary, so there are the advantages that the structure is simple and the handling also becomes easy, and thus it has attracted much attention in recent years.

Therefore, the replacement of the existing dehumidifier (2) in the compressed air source device of such things as railway cars by a hollow-fiber membrane type dehumidifier is being considered, but in such a case there is the problem that the number parts to be replaced is large and thus many man-hours and much effort is required for this assuming that the entire compressed air source device composed of the fastening unit (24) and the dehumidifier (2) shown in FIG. 9 is replaced with a compressed air source that includes a hollow-fiber type dehumidifier.

SUMMARY OF THE INVENTION

The present invention takes as its purpose the solving of the above-mentioned problems and the provision of a modified system as well as a dehumidification device and a dehumidifier configured such that it is possible to undertake with ease the modification of the a dehumidification device and a dehumidifier in the compressed air source device by replacing an absolute minimum number of parts.

For this purpose, the modified system of the dehumidifier in Claim 1 is equipped with (a) a dehumidification case that supports internally an adsorption/regeneration type dehumidification cartridge inserted from an opening part; (b) a check valve that is provided on this dehumidification case and that blocks the back flow from the secondary side by its being arranged in the passage that connects with the dry air discharge part of said dehumidification cartridge; (c) a regeneration restrictor arranged inside fastening holes formed inside said dehumidification case parallel to said check valve; and (d) a bottom cover that supports said dehumidification cartridge while cover the opening part of said dehumidification case; and includes a hollow-fiber membrane type dehumidification cartridge that can be supported on the interior of said dehumidification case, and a stopper plug for stopping up the fastening holes of said regeneration restrictor.

In other words, in the event that an adsorption/regeneration type dehumidifier is modified into a hollow-fiber membrane type dehumidifier, the dehumidification cartridge inside the dehumidification case is replaced with a hollow-fiber type cartridge from the adsorption/regeneration type cartridge, and in addition it is possible to modify this easily by removing said regeneration restrictor that becomes unnecessary in the hollow-fiber type dehumidifier and by blocking the fastening hole of this regeneration restrictor with said stopper plug, and thus it is possible to reduce the effort required for such modifications. In this instance, said dehumidification case and check valve, etc., can be used continuously in the same state they were in prior to modification, so it is possible to reduce the number of parts to be replaced.

The modified system of the dehumidifier in Claim 2 includes a bottom cover that supports said hollow-fiber membrane type dehumidification cartridge while cover the opening part of said dehumidification case and that forms an discharge opening that links with the purged air discharge part of this hollow-fiber membrane type dehumidification cartridge.

In other words, the hollow-fiber membrane type dehumidifier is configured such that the water vapor in the moist air inside the hollow-fiber membrane is drawn to the outside of the fiber membranes by causing a portion of the modified air after dehumidification is finished is caused to flow as dry air to the outside of the hollow fiber membrane, but the purged air is discharged smoothly to the outside of the dehumidifier through the medium of bottom cover in an assembled state by the provision in advance on said bottom cover of an discharge opening for the purpose of discharging the purged air after this water vapor has been absorbed to the outside of the dehumidifier.

The modified system of the dehumidifier in Claim 3 wherein said hollow-fiber membrane type dehumidification cartridge in Claim 1 possesses a restrictor on the dry air intake part. In other words, a restrictor has been provided on the dry air intake part in order to cause a portion of the dry air dehumidified by passing it through the hollow-fiber membranes to flow to the outside of the hollow-fiber membranes, but by providing beforehand this restrictor in a monobloc on said hollow-fiber membrane type dehumidification cartridge it is possible to reduce the number of parts required when modifying this into a hollow-fiber membrane type device.

The modified system of the dehumidifier in Claim 4 wherein said hollow-fiber membrane type dehumidification cartridge in Claim 1 possesses (a) a dehumidification part that bundles together multiple hollow-fiber membranes; and (b) an intermediate element that is provided such that it envelops this dehumidification part, and that forms a chamber through which the dry air in the area around the dehumidification part passes. Here, the device has been completely partitioned into a chamber through which the moist air prior to dehumidification passes and a chamber through which dry air passes by means of said intermediate element, and it thus is possible to prevent reliably the moist air from flowing to the outside of the hollow-fiber membranes and the dehumidification efficiency from declining as a result.

The modified system of the dehumidifier in Claim 5 wherein said intermediate element in Claim 4 is composed of (a) a tubular frame material that covers said dehumidification part in a circumferential direction; and (b) a cover material that forms the humid air intake part of said hollow-fiber membrane type dehumidification cartridge; and said intermediate element supports said dehumidification part by sandwiching it by means of this frame material and cover material. In other words, the device is configured such that it can support the dehumidification part even more reliably due to the fact that the intermediate part is composed of frame material and cover material and that the dehumidification part is supported by its being sandwiched by this frame material and cover material.

The modified system of the dehumidification device in Claim 6 is (a) an adsorption/regeneration type dehumidifier equipped with (i) a dehumidification case that supports internally an adsorption/regeneration type dehumidification cartridge inserted from an opening part; (ii) a check valve that is provided on this dehumidification case and that blocks the back flow from the secondary side by its being arranged in the passage that connects with the dry air discharge part of said dehumidification cartridge; (iii) a regeneration restrictor arranged inside fastening holes formed inside said dehumidification case parallel to said check valve; and (iv) a bottom cover that supports said dehumidification cartridge while cover the opening part of said dehumidification case, and (b) a modified system of an adsorption/regeneration type dehumidification device equipped with a fastening unit that is provided in a monobloc on the dehumidification case of this dehumidifier, and that possesses fastening brackets to a regenerated air tank and a vehicle [sic] connected with the secondary side of said dehumidifier; and is something that includes a hollow-fiber membrane type dehumidification cartridge that can be supported on the interior of said dehumidification case, and a stopper plug for stopping up the fastening holes of said regeneration restrictor.

According to said modified system, just as in the case of the dehumidifier in Claim 1, the dehumidification cartridge inside the dehumidification case is replaced with a hollow fiber type cartridge a the adsorption/regeneration type item, and in addition it is possible to modify this easily by removing said regeneration restrictor that becomes unnecessary in the hollow-fiber type dehumidifier and by blocking the fastening hole of this regeneration restrictor with said stopper plug, and in addition it is possible to reduce the number of parts to be replaced. In addition, at the time of such modification changes in the method of fastening to the vehicle and the piping become unnecessary, so it is possible to reduce further the difficulty involved in the modification.

The modified system of the dehumidifier in Claim 7 wherein in the composition in Claim 6 said fastening unit supports said dehumidification case, and possesses (a) a tube seat surface on one side that forms a connection opening towards the secondary side and discharge opening of said dehumidifier, respectively; (c) a tube seat surface on the other side to which can be fastened (i) a discharge valve connected with the discharge opening of said dehumidifier and (ii) a solenoid-controlled valve that links together or isolates from each other the pilot pressure chamber of this discharge valve and said regenerated air tank; and said modified system includes a blocking plate that blocks the connection openings to said discharge valve and solenoid-controlled valve formed on the other tube seat surface of said fastening unit.

In other words, the discharge valve and solenoid-controlled valve that have been fastened to said tube seat surface on the other side become unnecessary in the event that the device is modified into a hollow-fiber membrane type device, but the connection openings of said tube seat surface on the other side becomes exposed when this discharge valve and solenoid-controlled valve are removed. Thus, the modified device in Claim 7 is configured such that suitable action is performed after its modification into a hollow-fiber type device by blocking these connection openings with a blocking plate.

The modified system of the dehumidifier in Claim 8 wherein in Claim 7 (a) it is possible to fasten a check valve that is positioned inside the passageway that links the secondary side of said regenerated air tank and the discharge opening for the dry air provided on the outer circumferential wall of said fastening unit, and that inhibits the back flow to the regenerated air tank, to the other tube seat surface of said fastening unit, and (b) the modified system includes a blocking plate with a passageway that links the connection openings of the primary side and the secondary side of said check valve formed on the other tube seat surface of this fastening unit.

In other words, since in the case of the hollow-fiber membrane type dehumidification device regeneration by causing the back flow of compressed air from the regenerated air tank to the dehumidifier when the air compressor is stopped becomes unnecessary, the regenerated air tank itself becomes basically unnecessary, but in the case of this invention removal of the regenerated air tank is not undertaken at the time of modification from the standpoint of making the greatest possible continuous use of the component parts of the fastening unit that includes the regenerated air tank, so continuous use was adopted for the regenerated air tank as a simple passageway after modification of the device into a hollow-fiber membrane type device.

In this case, since the back flow of compressed air from the regenerated air tank to the dehumidifier as described above is not carried out, the check valve used for preventing back flow to said regenerated air tank becomes unnecessary, and thus it is possible to remove this check valve at the time of modification, and in that case the connection openings of said check valve on the tube seat surface on the other side of the fastening unit become exposed. Then, in Claim 8, by using the above-mentioned blocking plate with a passageway said connection holes of the tube seat surface on the other side are blocked, and in addition by linking the claims [sic] for the primary side and the secondary side of the check valve that has been removed with a passageway inside said blocking plate it is possible to maintain the relationship of linkage between the two and to make the action after modification proper.

The compressed air dehumidifier in Claim 9 is equipped with (a) a dehumidification case that supports internally an adsorption/regeneration type dehumidification cartridge inserted from an opening part; (b) a hollow-fiber membrane type dehumidification cartridge inserted from said opening part and supported inside said dehumidification case instead of said adsorption/regeneration type dehumidification cartridge; (c) a check valve that is provided on said dehumidification case, and that hinders the back flow from the secondary side by its being arranged in the passageway that connects with the dry air discharge part of said dehumidification cartridge; (d) a blocking plug that blocks the fastening holes of the regeneration restrictor arranged inside fastening holes parallel to said check valve; and (e) a bottom cover that supports said dehumidification cartridge while cover the opening part of said dehumidification case.

According to the composition, in the event that an adsorption/regeneration type dehumidifier is modified into a hollow-fiber type dehumidifier, the dehumidification case is used as is and the adsorption/regeneration dehumidification cartridge is replaced with a hollow-fiber membrane type item, and in addition there is the advantage that it is possible to modify this easily only by removing the regeneration restrictor and attaching a stopper plug.

The compressed air dehumidifier in Claim 10 wherein in Claim 9 said bottom cover possesses an discharge opening that is linked with purged air discharge part of said hollow-fiber membrane type dehumidification cartridge. According to said composition, there is the advantage that the purged air after modification into a hollow-fiber membrane dehumidifier can be discharged smoothly from the discharge opening provided in advance on the bottom cover.

The compressed air dehumidifier in Claim 11 is equipped with (a) a dehumidification case that supports internally an adsorption/regeneration type dehumidification cartridge inserted from an opening part; (b) a hollow-fiber membrane type dehumidification cartridge inserted from said opening part and supported inside said dehumidification case instead of said adsorption/regeneration type dehumidification cartridge; (c) a check valve that is provided on said dehumidification case, and that hinders the back flow from the secondary side by its being arranged in the passageway that connects with the dry air discharge part of said dehumidification cartridge; (d) a blocking plug that blocks the fastening holes of the regeneration restrictor arranged inside fastening holes parallel to said check valve; and (e) a bottom cover that supports said dehumidification cartridge while cover the opening part of said dehumidification case.

According to said composition, just as in Claim 9, in the event that an adsorption/regeneration type dehumidifier is modified into a hollow-fiber type dehumidifier, the dehumidification case is used as is and the adsorption/regeneration dehumidification cartridge is replaced with a hollow-fiber membrane type item, and in addition there is the advantage that it is possible to modify this easily only by removing the regeneration restrictor and attaching a stopper plug. In addition, at the time of such modification changes in the method of fastening to the vehicle and the piping become unnecessary, so it is possible to reduce further the difficulty involved in the modification.

The compressed air dehumidification device in Claim 12 wherein in Claim 11 (a) said fastening unit is equipped with (i) said tube seat surface on one side that supports said dehumidification case; and (ii) said tube seat surface on the other side to which can be fastened (i) a discharge valve connected with the discharge opening of said dehumidifier; (ii) a solenoid-controlled valve that links together or isolates from each other the pilot pressure chamber of this discharge valve and said regenerated air tank; and (iii) a check valve that is positioned inside the passageway that links the secondary side of said regenerated air tank and the discharge opening for the dry air provided on the outer circumferential wall of said fastening unit, and that inhibits the back flow to the regenerated air tank, to the other tube seat surface of said fastening unit; a blocking plate that blocks the connection openings to said discharge valve, solenoid-controlled valve and check valve has been fastened to this other tube seat surface.

In other words, the discharge valve, the solenoid-controlled valve and the check that have been fastened to said tube seat surface on the other side become unnecessary in the event that the device is modified into a hollow-fiber membrane type device, but the connection openings of said tube seat surface on the other side becomes exposed when this discharge valve, the solenoid-controlled valve and the check valve are removed. Thus, in Claim 12 the device is configured such that suitable action is performed after its modification into a hollow-fiber type device by blocking these connection openings with a blocking plate.

DETAILED DESCRIPTION OF THE INVENTION

Figure 1:
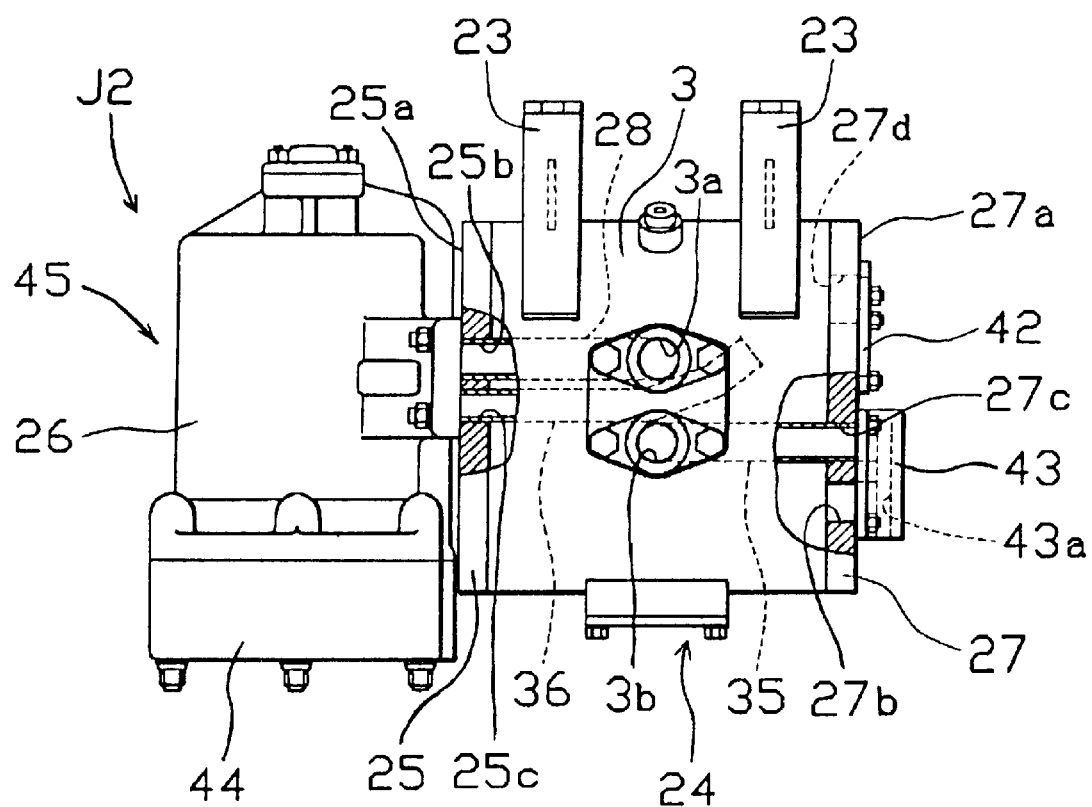
FIG. 1 is a summary front view showing the compressed air source device that includes a dehumidification device after modification into a hollow-fiber membrane type device for the mode of the embodiment of the present invention.
Figure 2:
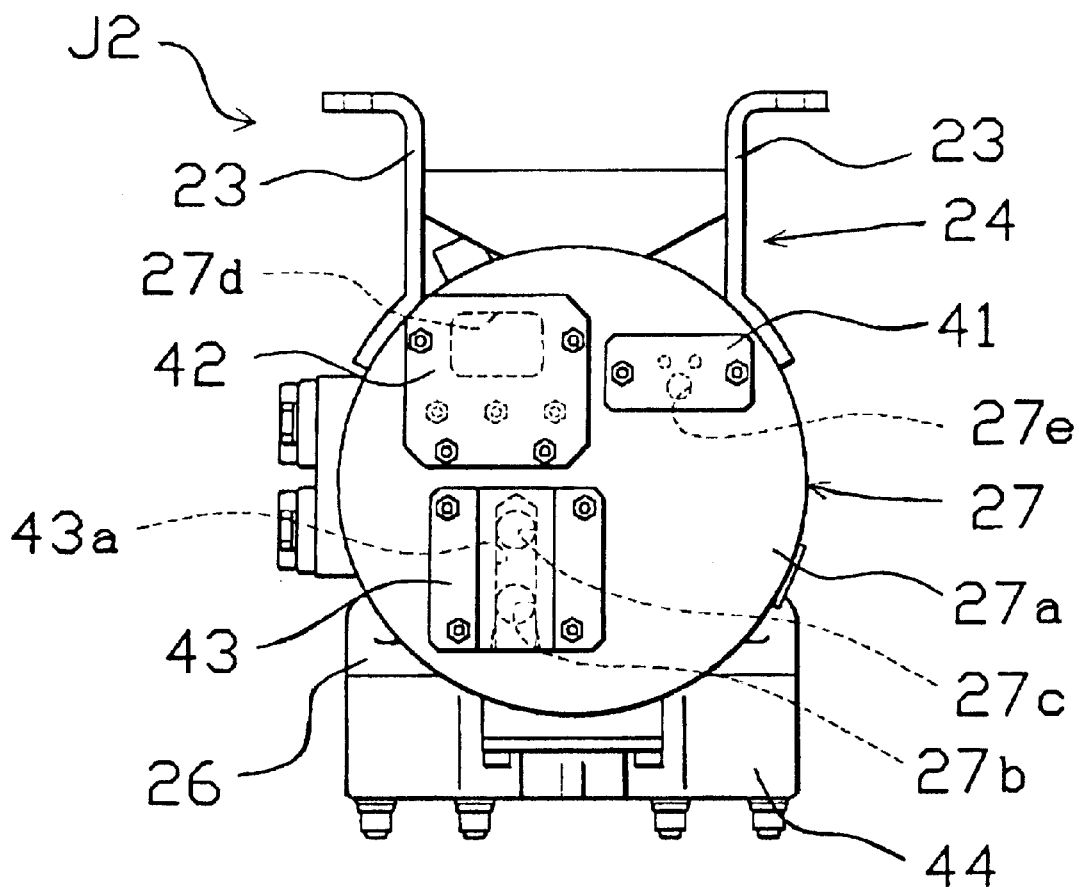
FIG. 2 is a lateral view showing the fastening unit of said compressed air source device.

An explanation follows below of the mode for embodiment of the present invention based on figures. An item that modifies the compressed air source device including the conventional adsorption/regeneration dehumidifier (2) shown in FIG. 9 and FIG. 10 into the compressed air source device including a hollow-fiber type dehumidifier (45) by means of the modified system that constitutes the present invention is shown in FIG. 1 and FIG. 2. The dehumidification device (J2) after modification is composed of a fastening unit (24) and a hollow-fiber type dehumidifier (45).

Figure 9:
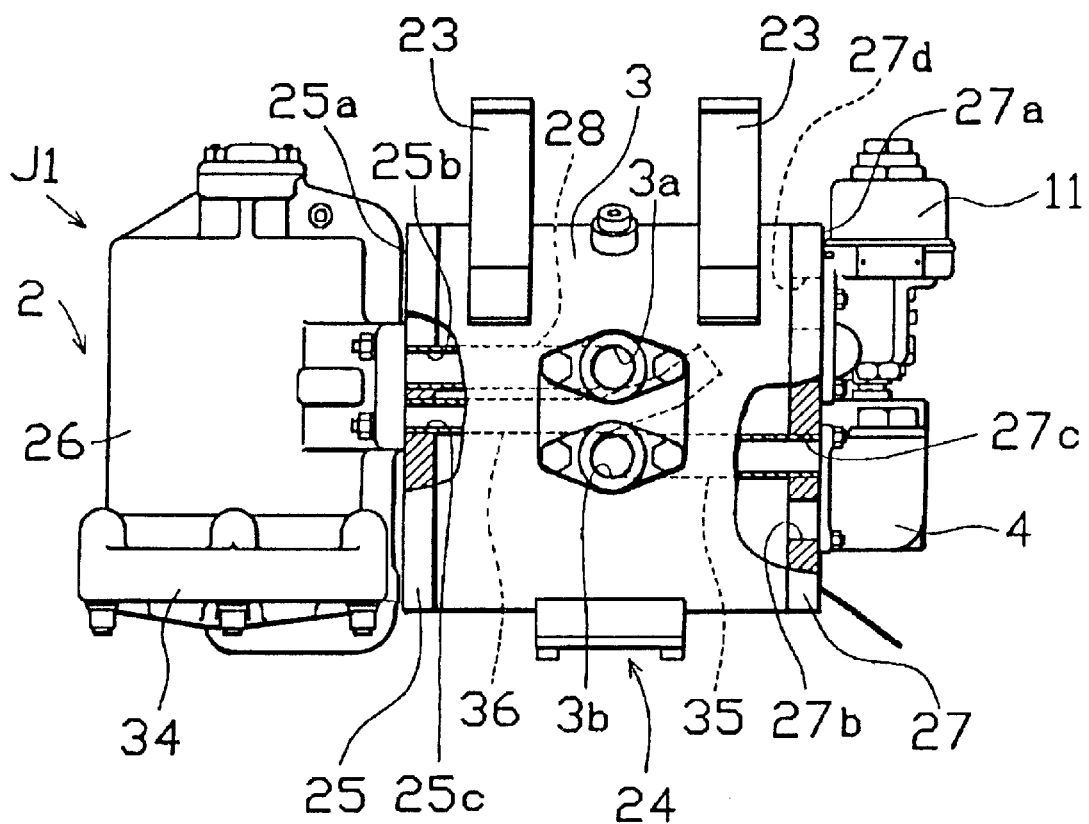
FIG. 9 is a summary front view showing the abovementioned conventional prior art compressed air source device.
Figure 10:
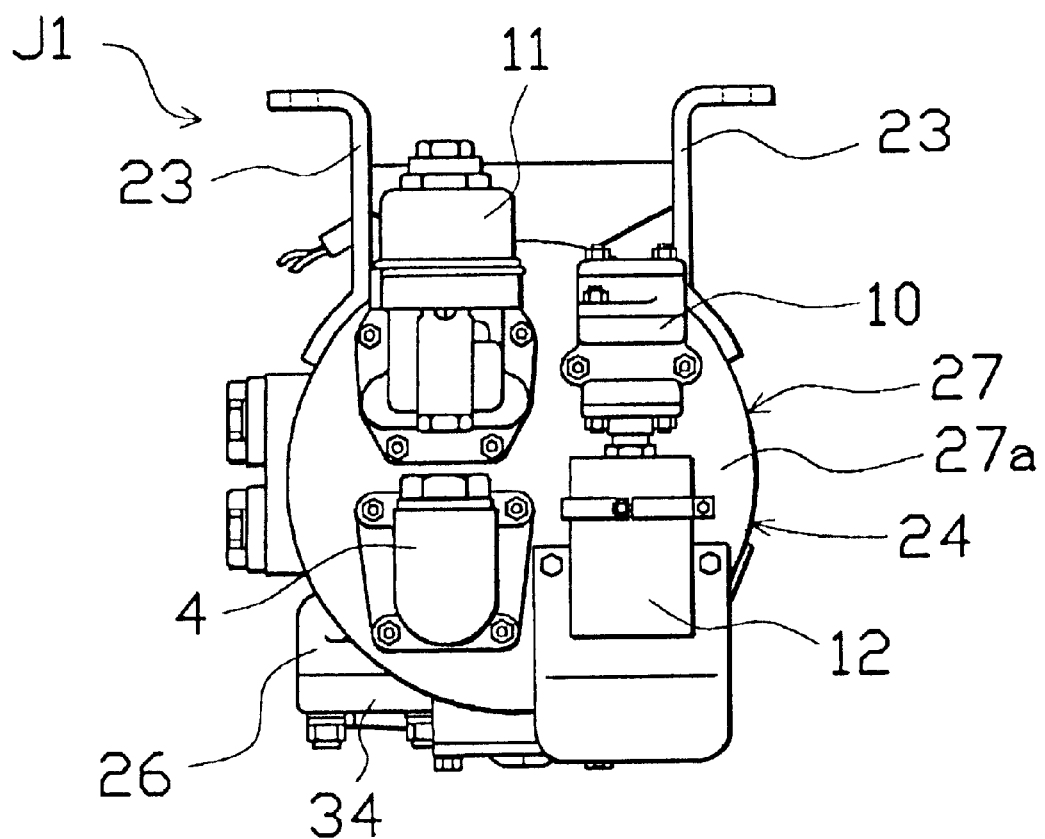
FIG. 10 is a summary lateral view showing the fastening unit of the prior art compressed air source device in shown in FIG. 9.

As is clear from a comparison of FIG. 9 and FIG. 10, which show the device, prior to modification with FIG. 1 and FIG. 2, which show the device, after the modification, the fastening unit has not been changed whatsoever before and after modification, and therefore the internal structure of the regenerated air tank (3) that constitutes the main part of the fastening unit (24), that is, the state prior to modification of points including the coupling tubes (28, 35, 36), etc. has been maintained in that state. In addition, as far as the dehumidification case (26) is concerned as well the item employed before modification has been used as is after modification too.

On the other hand, the discharge valve (10), the solenoid-controlled valve (11) and the check valve (4) which had been fastened to the tube seat surface (27a) of said tube seat (27) on the other side of the fastening unit (24) have been removed, and the muffler (12) has also been removed together with the discharge valve (10). Then, as is clear from FIG. 2, blocking plates (41 to 43) have respectively been fastened to the positions to which the discharge valve (10), the solenoid-controlled valve (11) and the check valve (4) had been fastened.

The blocking plate (41) is something that has been fastened to the tube seat surface (27a) in the place of the discharge valve (10), and the leakage of the compressed air inside the regenerated air tank (3) to the outside through the medium of the connection opening (27e) has been prevented by blocking said connection opening (27e), whereby said coupling tube (36) inside the regenerated air tank (3) and the discharge valve (10) (said second chamber (10b)) had been linked.

In addition, the blocking plate (42) is something that has been fastened to the tube seat surface (27a) in the place of the solenoid-controlled valve (11), and the leakage of the compressed air inside the regenerated air tank (3) has been prevented by blocking said connection opening (27d), whereby the inside of the regenerated air tank (3) and the solenoid-controlled valve (11) (said second chamber (11b)) had been linked.

Moreover, the blocking plate (43) is something that has been fastened to the tube seat surface (27a) in the place of the check valve (11), but a passageway (43a) that extends in an upward and downward direction has been formed on the interior of this blocking plate (43). This passageway (43a) plays the role of linking (a) said connection opening (27c) provided on the tub seat (27) and the end (the center right end in FIG. 1) of said coupling tube (35) arranged inside the regenerated air tank (3), and the device is configured such that the compressed air that has dehumidified by the hollow-fiber membrane type dehumidifier (45) (refer to FIG. 3) described below and sent into the regenerated air tank (3) is sent to said compressed air exit (3b) though the medium of the connection opening (27b), the passageway (43a) and the coupling tube (35).

Figure 3:
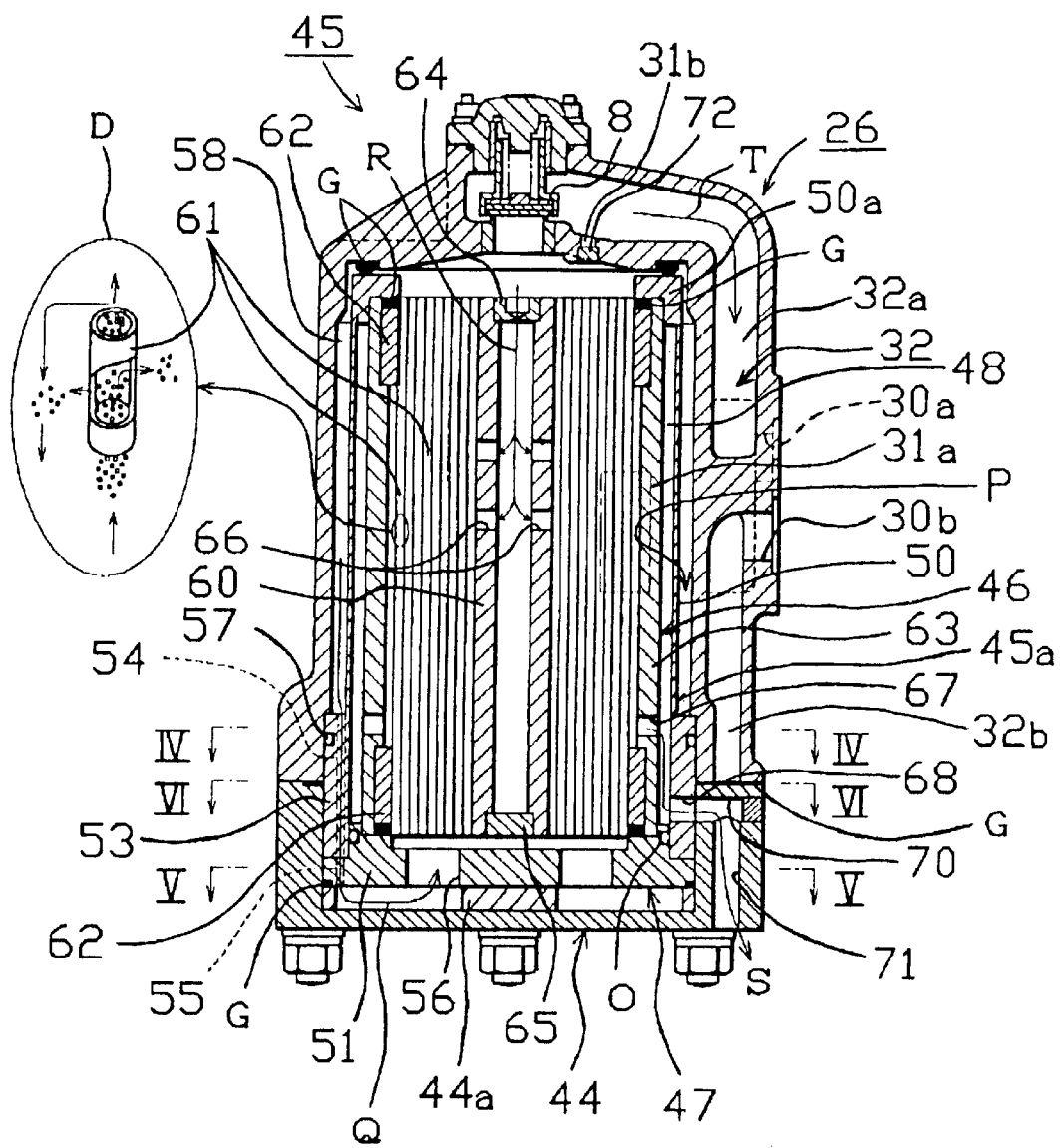
FIG. 3 is an explanatory diagram of a cross section showing the dehumidification case of said compressed air source device.
Figure 11:
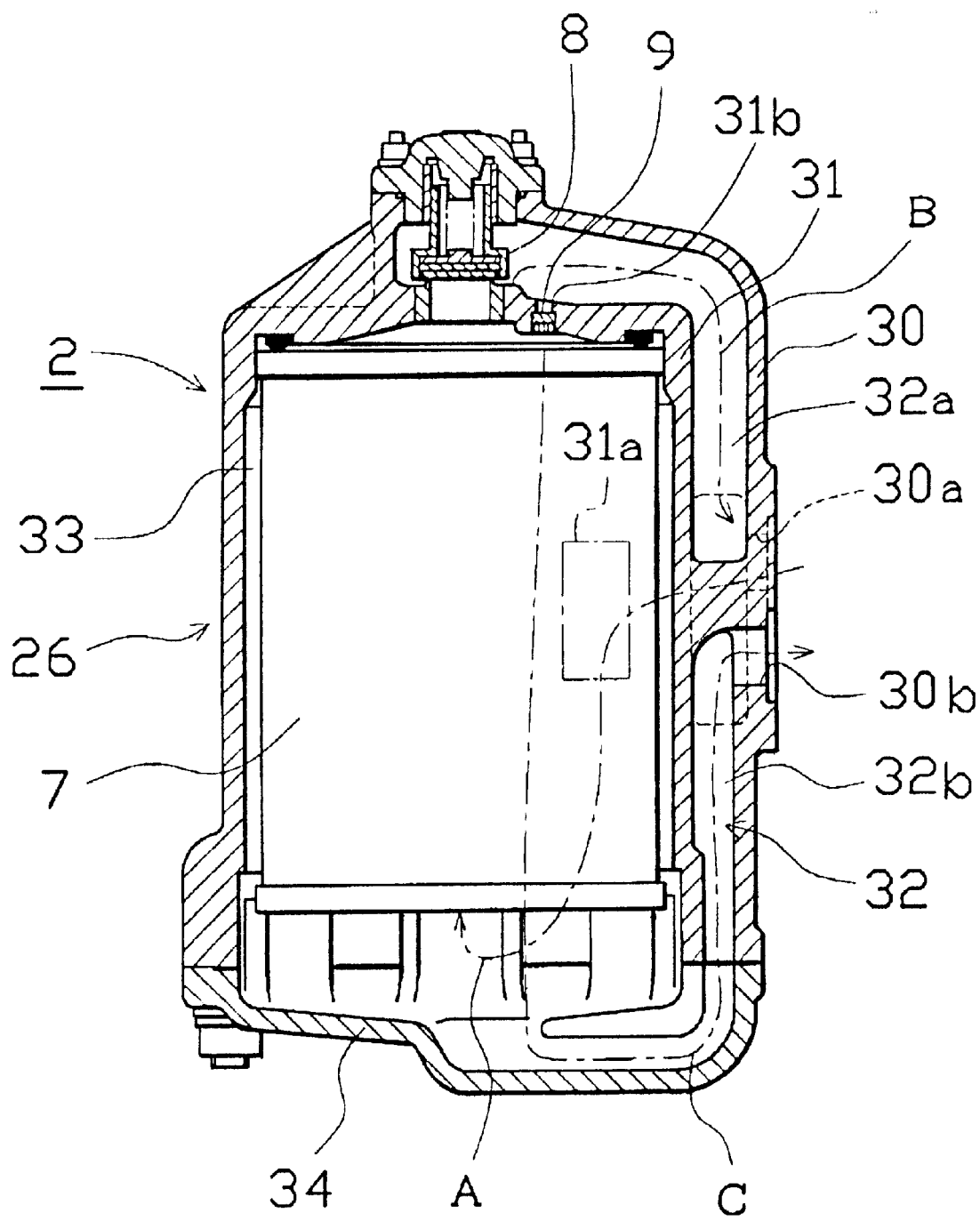
FIG. 11 is an explanatory diagram of a cross section showing the dehumidification case of the prior art compressed air source device in FIG. 9.

Next, as is clear if one compares FIG. 11, which shows the internal structure of the dehumidification case (26) prior to modification and FIG. 3, which shows the internal structure after modification, the same items have been used for the dehumidification case itself (26) both before and after modification, and therefore the composition of the entrance hole (30a) and exit hole (30b) provided on the dehumidification case (26) and the linkage opening (31a) and each passageway (32a, 32b), etc. provided on the inner wall (31) have not been altered. On the other hand, the bottom cover (44) has been replaced with an item that differs in structure from the bottom cover (34) prior to modification.

An explanation follows below of how the inside of the dehumidification case (26) has been modified and how the bottom cover (44) is linked with this dehumidification case (26). As shown in FIG. 3, the adsorption/regeneration dehumidification cartridge (7) prior to modification has been extracted and in its place a hollow-fiber membrane type dehumidification cartridge (45a) has been inserted inside the dehumidification case (26).

This dehumidification cartridge (45a) is composed of a dehumidification part (46) and an intermediate element (47) that envelops the dehumidification part (46). The intermediate element has been composed by a roughly cylindrical frame material (50) that surrounds the outer circumference of said dehumidifier part (46) by sandwiching the annular space (48) between it and the outer circumference of the roughly cylindrical dehumidifier part (46), and a cover material (51) that supports the lower end part of the dehumidifier part (46) at the lower end of the frame material (50). In addition, a folded part (50a) that is folded in a inward direction has been formed on the upper end of the frame material (50), and this folded part (50a) is in contact with the upper part of the dehumidification part (46), and it is regulating the upper end position.

Figure 4:
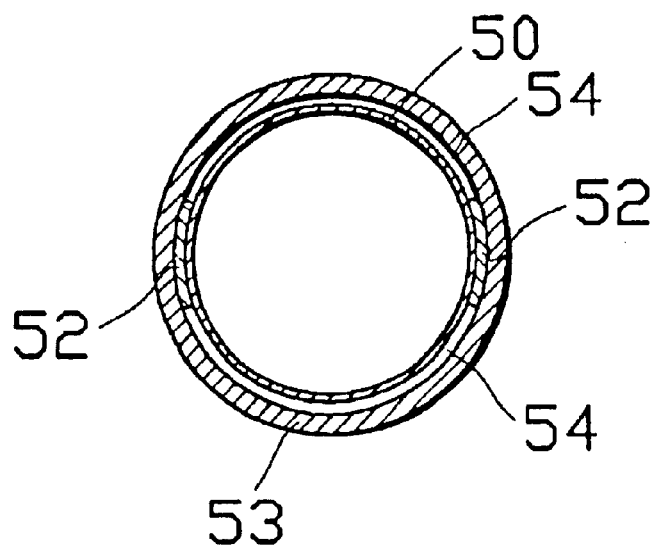
FIG. 4 is a summary cross section diagram along the IV—IV line of FIG. 3.

As shown in FIG. 4, a large bore ring (53) has been mated and fixed to the same core through the medium of a pair of pieces of circular interval maintenance material (52) on the outer circumference of the lower end part of the frame material (50), and owing to this a circular passageway (54) that extends in an upward and downward direction has been formed between the lower end part of the frame material (50) and the large bore ring (53).

Figure 5:
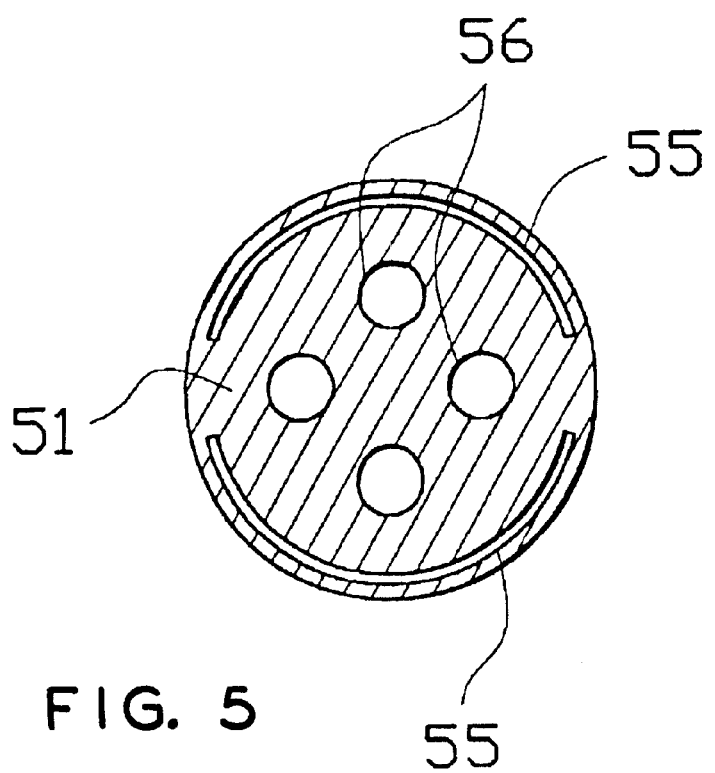
FIG. 5 is a summary cross section diagram along the V—V line of FIG. 3.

In addition, as shown in FIG. 5, a passageway (55) that is circular in section and that links to the above-mentioned passageway (54) has been formed so that it passes completely through in the upper and lower directions in the proximity of the outer periphery of the cover material (51), and in addition multiple passageways (56) that are round in section have been formed such that they pass completely through in the upper and lower directions in the proximity of the central part of the cover material (51). In FIG. 3, the outer periphery of the above-mentioned large bore ring (53)

has been mated to the inner periphery of the inner wall (31) of the dehumidification case (26), and in addition an annular space (58) has been formed between the outer periphery of the frame material (50) other than its lower part and the inner periphery of the inner wall (31).

The dehumidification part (46) is composed of (a) a hollow shaft (60) arranged in a vertical direction in the center; (b) multiple hollow-fiber membranes (61) arranged such that they extend in a vertical direction roughly parallel to one another across a prescribed interval in the area surrounding this hollow shaft (60); (c) an upper and lower pair of ring-shaped bundling elements (62) that bundle together said multiple hollow-fiber membranes on the outer circumferential side of the upper end part and the lower end part of each hollow-fiber membrane; and (d) a roughly cylindrical casing (63) arranged on the outer circumferential side of these bundling elements (62); and said space (48) is formed between this casing (63) and the frame material (50).

A restrictor (64) used for introducing dry air has been mated to the upper end part of the hollow shaft (60), and in addition a stopper plug (65) has been mated to the lower end part of the hollow shaft (60). In addition, multiple linkage openings (66) that penetrate through in the direction of its thickness have been formed on the hollow shaft (60).

As shown in the enlarged figure (D) in FIG. 3, while moist air wherein a water vapor molecule Y (black circle) is contained in an air molecule X (white circle) flows through the inside of the hollow-fiber membrane (61) in an upwards direction, only the water vapor molecule Y permeates the hollow-fiber membrane (61) in the direction of its thickness and is discharged to the outside of the hollow-fiber membrane (61), and owing to this dehumidification is performed. Now, since this dehumidification is promoted by the action of the partial pressure of the water vapor, a portion of the dry air (air molecule X) that has passed through the hollow-fiber membrane (61) flows to the area surrounding the hollow-fiber membrane (61) as dry air, as is described below.

While a linkage opening (67) for the purpose of linking the space inside the casing (63) with said space (48) has been formed in the vicinity of the lower end part of the casing (63), a linkage opening (68) (dry air discharge part) in a radial direction exposed to said space (48) has been formed on the frame material (50), the interval maintenance material (52) and the large bore ring (53). Moreover, a horizontal linkage opening (70) linked with this linkage opening (68) has been provided in a radial direction in the vicinity of the upper end part of the lower cover (44), and a discharge opening (71) that links together the horizontal linkage opening (70) and the exterior has been formed in a vertical direction on the bottom cover (44) (refer to FIG. 6).

Figure 6:
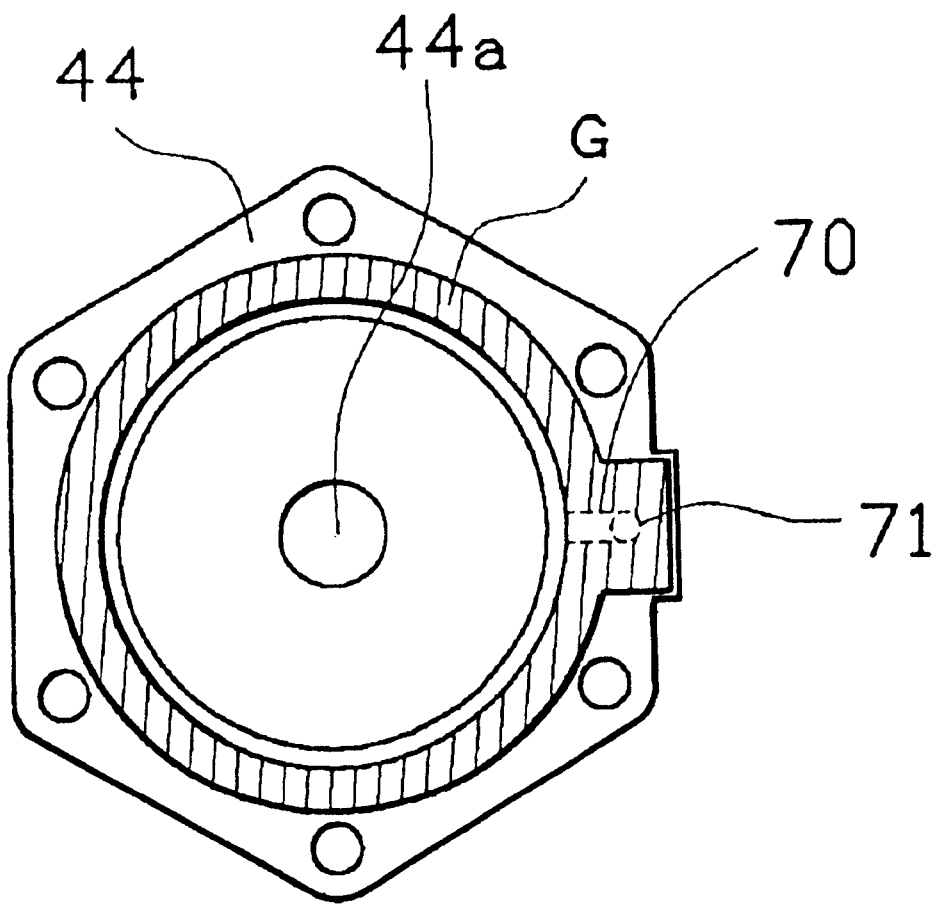
FIG. 6 is a summary cross section diagram along the VI—VI line of FIG. 3.

Now, in FIG. 6 the item indicated by the hatching is a gasket (G) arranged between the dehumidification case (26) and the bottom cover (44). In addition, a protrusion (44a) for the purpose of supporting said cover material (51) has been formed in the central position of the bottom part upper surface of the bottom cover (44).

In FIG. 3, a check valve (8) that allows only circulation from the dehumidifier (46) side to said passageway (32a) side has been arranged at the upper end part of the inside of the dehumidifier case (26) in the same manner as prior to modification, but the restrictor (9) that had been arranged inside the fastening hole (31b) provided on the inner wall (31) parallel with this check valve (8), and in its place a stopper plug (72) has been mated to the inside of the fastening hole (31b). Now, in FIG. 3, each (G) is a gasket, and each (O) is an O-ring, and for the sake of convenience each gasket (G) in the cross section has been shown by painting it over with black.

Figure 7:
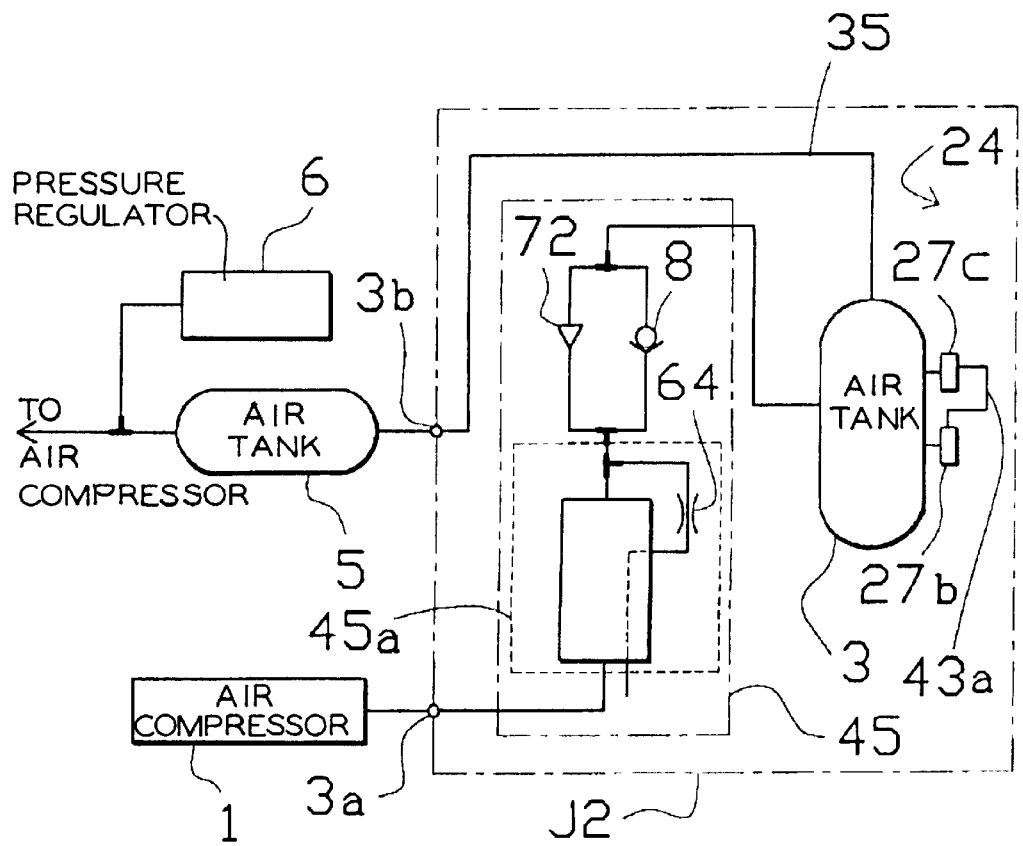
FIG. 7 is an explanatory diagram showing the air pressure circuit of said compressed air source device.
Figure 8:
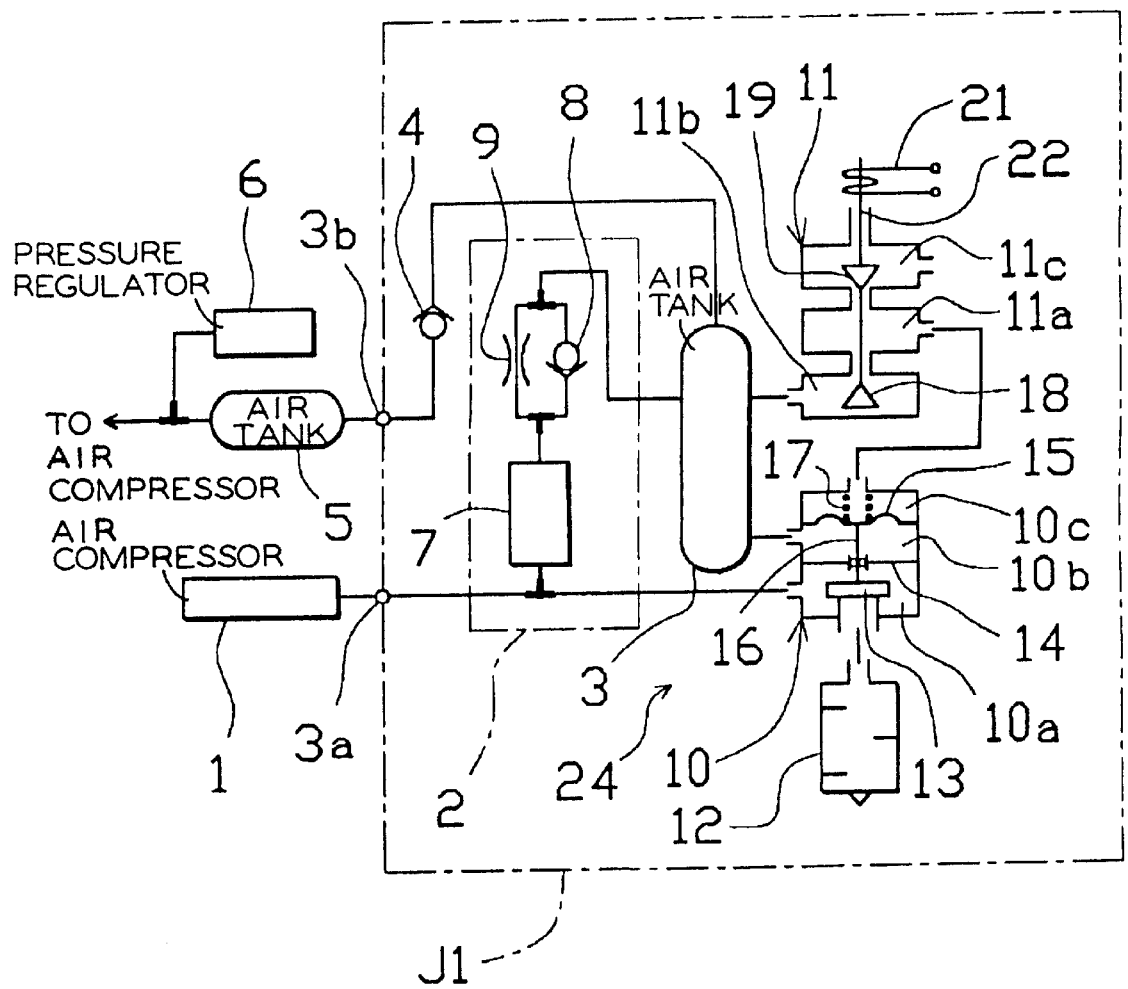
FIG. 8 is an explanatory diagram showing the composition of an air pressure circuit of a prior art compressed air source device that includes a conventional adsorption/regeneration type dehumidification device prior to modification.

If one were to show the compressed air source device that includes said hollow-fiber membrane type dehumidifier (45) after modification with an air pressure circuit diagram, it would look like FIG. 7. An explanation follows below of the action of the compressed air source device that includes said hollow-fiber membrane type dehumidifier (45) after modification while contrasting the circuit diagram in FIG. 7 with the actual structure after modification shown in FIG. 1 to FIG. 3.

In other words, the compressed air from the air compressor (1) is supplied to the compressed air entrance opening (3a) of the regenerated air tank (3), and the compressed air in this moist state is sent from the compressed air entrance opening (3a) to said entrance hole (30a) of the dehumidifier case (26) through the medium of said coupling tube (26) inside the regenerated air tank (3). Next, the compressed air introduced from the entrance hole (30a) to the inside of said outer chamber (32) is sent into the space between the inner wall (31) and the frame material (50) through the medium of the linkage opening (31a) of said inner wall (31) as shown by the arrow P in FIG. 3.

The compressed air inside the space (48) flows downwards, and as shown by the arrow Q it passes through the passageway (54) between said frame material (50) and the large bore ring (53) and then the passageway (55) of the cover material (51) and reaches the space between the cover material (51) and the bottom cover (44), and it is supplied to the lower end opening of the hollow-fiber membranes (61) through the medium of the passageway (55) of the cover material (51). Then, while the compressed air passes upwards through the inside of these hollow-fiber membranes (61), the compressed air after dehumidification is emitted in a dry state from the upper end exit of the hollow-fiber membranes (61).

The dry air that has arrived at the upper end exit of the hollow-fiber membranes (61) pushes open the check valve (8) upwards and then reaches said passageway (32a), then flows as shown by the arrow T, and is then sent inside the regenerated air tank (3) through the medium of the exit hole of the dehumidification case (26) and the connection opening of the tub seat (25).

On the other hand, a portion of the dry air in the dry air discharge part passes through the restrictor (64) and reaches the space inside the hollow shaft (60), and then passes through the linkage opening (66) and is supplied to the area surrounding the hollow-fiber membranes (61). This dry air flows downward through the inside of the casing (63) while raising the dehumidifying efficiency by absorbing water vapor, and arrives at said space (48) through the medium of said linkage opening (67) of the casing (63). After that, the purged air after the absorption of the water vapor flows downwards through the inside of the space (48) as shown by the arrow S, and it is then emitted to the exterior through the medium of the linkage opening (68) of the frame material (50), etc., the horizontal linkage opening (70) of the bottom cover (44) and the discharge opening (71).

The dry air inside the regenerated air tank (3) reaches the compressed air exit (3b) through the medium of the connection opening (27b) of the tube seat (27), the passageway (43a) inside the blocking plate (43) and the coupling tube (35) inside the regenerated air tank (3), and is sent to the original air tank (5) in FIG. 7 from this compressed air exit (3b). As described above, the regenerated air tank (3) after modification is simply playing a role as the passageway for the compressed air.

When the pressure inside the original air tank (5) attains the upper limit value set in advance due to the fact that the supply of compressed air to the original air tank (5) is continued for a prescribed period of time, the pressure regulator (6) begins to operate and the air compressor (1) is stopped, but in the case of the hollow-fiber membrane type dehumidification device (J2) after modification the regenerative action of the dehumidifier (45) is not necessary when the air compressor (1) is stopped. At this time, the back flow of compressed air from the original air tank (5) is performed by the check valve (8) inside the dehumidifier (45). In addition, because the restrictor (9) that had been fastened to the inside of the fastening hole (31b) of the dehumidification case (26) prior to modification has been replaced with a stopper plug (72), there is no back flow of compressed air from the fastening hole (31b).

As noted above, in the mode of the present embodiment, since the device is configured such that only the absolute minimum number of parts, in other words, the dehumidification cartridge (45a), the stopper plug (72), etc., are replaced at the time of its modification into a hollow-fiber membrane type device, the effort required for such modification has been reduced. In addition, since blocking plates (41 to 43) have been fastened respectively in the place of the discharge valve (10), the solenoid-controlled valve (11) and the check valve (4) that were removed from the fastening unit (24), it is possible to assure its proper operation as a compressed air source device even after modification. In addition, by modifying the device into a hollow-fiber membrane type device the discharge valve (10), the solenoid-controlled valve (11), etc. become unnecessary, so it becomes possible to reduce the effort required for maintenance as well.

I claim:

1. In combination with a dehumidifier having a dehumidification case that internally supports a dehumidification cartridge, a check valve provided on said dehumidification case arranged in a passage that connects with a dry air discharge portion of said dehumidification cartridge for blocking back flow from a secondary side, a regeneration restrictor arranged in said dehumidification case parallel to said check valve, and a bottom cover supporting said dehumidification cartridge while covering an opening in said dehumidification case;

the improvement comprises a hollow-fiber membrane type dehumidification cartridge disposed in said dehumidifier and supported on an interior portion of said dehumidification case, and a stopper plug for stopping fastening holes formed in said regeneration restrictor.

2. The combination, according to claim 1, wherein said dehumidification case includes a bottom cover that supports said hollow-fiber membrane type dehumidification cartridge while covering the opening in said dehumidification case, and forms a discharge opening that links with the purged air discharge portion of said hollow-fiber membrane type dehumidification cartridge.

3. The combination, according to claim 1, wherein said hollow-fiber membrane type dehumidification cartridge includes a restrictor on a dry air intake part.

4. The combination, according to claim 1, wherein said hollow-fiber membrane type dehumidification cartridge includes a dehumidification part that bundles together multiple hollow-fiber membranes and an intermediate element that is provided such that it envelops said dehumidification part, and that forms a chamber through which dry air in the area around said dehumidification part passes.

5. The combination, according to claim 4, wherein said intermediate element is composed of a tubular frame material that covers said dehumidification part in a circumferential direction and a cover material that forms a humid air intake part of said hollow-fiber membrane type dehumidification cartridge and wherein said intermediate element supports said dehumidification part by sandwiching it by means of said tubular frame material and said cover material.

6. In combination with a dehumidifier having a dehumidification case that internally supports a dehumidification cartridge, a check valve provided on said dehumidification case arranged in a passage that connects with a dry air discharge portion of said dehumidification cartridge for blocking back flow from a secondary side, a regeneration restrictor arranged in said dehumidification case parallel to said check valve, and a bottom cover supporting said dehumidification cartridge while covering an opening in said dehumidification case, a fastening unit provided in a monobloc on said dehumidification case of said dehumidifier and fastening brackets connected to a regenerated air tank and said secondary side of said dehumidifier;

the improvement comprises a hollow-fiber membrane type dehumidification cartridge disposed in said dehumidifier and supported on an interior portion of said dehumidification case, and a stopper plug for stopping fastening holes formed in said regeneration restrictor.

7. The combination, according to claim 6, wherein said fastening unit supports said dehumidification case, and includes a tube seat surface on one side that forms a connection opening towards said secondary side and a discharge opening of said dehumidifier, respectively and a tube seat surface on an opposed side to which can be fastened a discharge valve connected with said discharge opening of said dehumidifier and a solenoid-controlled valve that one of links together and isolates from each other a pilot pressure chamber of said discharge valve and said regenerated air tank; said combination further includes a blocking plate that blocks connection openings to said discharge valve and said solenoid-controlled valve formed on an opposed surface of said tube seat of said fastening unit.

8. The combination, according to claim 7, wherein it is possible to fasten a check valve that is positioned inside a passageway linking said secondary side of said regenerated air tank and said discharge opening for the dry air provided on an outer circumferential wall of said fastening unit, and which inhibits said back flow to said regenerated air tank, to said opposed tube seat surface of said fastening unit, and said combination includes a blocking plate with a passageway that links said connection openings of a primary side and said secondary side of said check valve formed on said opposed tube seat surface of said fastening unit.

9. A compressed air dehumidifier comprising:
(a) a dehumidification case;
(b) a hollow-fiber membrane type dehumidification cartridge inserted from an opening in said dehumidification case and supported internally thereof;
(c) a check valve disposed on said dehumidification case that hinders back flow from a secondary side by said check valve by being arranged in a passageway that connects with a dry air discharge portion of said dehumidification cartridge;
(d) a blocking plug that blocks fastening holes of a regeneration restrictor arranged inside fastening holes parallel to said check valve; and (e) a bottom cover that supports said dehumidification cartridge while covering said opening in said dehumidification case.

10. A compressed air dehumidifier, according to claim 9, wherein said bottom cover includes a discharge opening that is linked with a purged air discharge part of said hollow-fiber membrane type dehumidification cartridge.

11. A compressed air dehumidifier, according to claim 9, wherein a fastening unit disposed on a monobloc on said dehumidification case is equipped with a tube seat surface on one side that supports said dehumidification case and a tube seat surface on an opposed side to which can be fastened a discharge valve connected with a discharge opening in said dehumidification case, a solenoid-controlled valve that one of links together and isolates from each other a pilot pressure chamber of said discharge valve and said regenerated air tank, a check valve positioned inside a passageway linking said secondary side of said regenerated air tank and a discharge opening for dry air provided on an outer circumferential wall of said fastening unit that inhibits back flow to said regenerated air tank, and a blocking plate that blocks connection openings to said discharge valve, said solenoid-controlled valve and said check valve is fastened to said opposed tube seat surface.

* * * * *